(12) United States Patent  
Matama

(10) Patent No.: US 6,694,052 B1
(45) Date of Patent: Feb. 17, 2004

(54) IMAGE REPRODUCING METHOD AND APPARATUS

(75) Inventor: Tooru Matama, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/503,334

(22) Filed: Feb. 14, 2000

Related U.S. Application Data

(63) Continuation of application No. 08/741,722, filed on Oct. 31, 1996, now Pat. No. 6,101,273.

(30) Foreign Application Priority Data

Oct. 31, 1995 (JP) ................................. 7/283144

(51) Int. Cl.$^7$ ........................... G06K 9/00; G06K 9/40; H04N 1/40
(52) U.S. Cl. ..................... 382/169; 382/167; 382/274; 358/461
(58) Field of Search ..................... 382/239, 169, 382/167, 168, 270, 274, 272; 345/147; 348/251, 254; 358/461, 520, 455, 443, 448; 395/126; 250/587; 347/115, 131, 283

(56) References Cited

U.S. PATENT DOCUMENTS

| | | | |
|---|---|---|---|
| 4,340,911 A | 7/1982 | Kato et al. | 358/455 |
| 4,731,662 A | 3/1988 | Udagawa et al. | 358/520 |
| 5,012,333 A * | 4/1991 | Lee et al. | 358/520 |
| 5,046,147 A * | 9/1991 | Funahashi et al. | 250/587 |
| 5,123,059 A * | 6/1992 | Hirosawa et al. | 382/272 |
| 5,194,878 A * | 3/1993 | Murakami et al. | 347/115 |
| 5,237,431 A * | 8/1993 | Imoto | 358/445 |
| 5,351,306 A | 9/1994 | Finkler et al. | 382/169 |
| 5,414,538 A | 5/1995 | Eschbach | 358/520 |
| 5,748,773 A * | 5/1998 | Tashiro et al. | 382/169 |
| 6,108,105 A * | 8/2000 | Takeuchi et al. | 358/455 |

FOREIGN PATENT DOCUMENTS

| | | | | |
|---|---|---|---|---|
| DE | 4309879 A1 | 10/1993 | | H04N/1/46 |
| EP | 0377386 | 7/1990 | | H04N/1/40 |
| GB | 2069794 A | 8/1981 | | H04N/1/40 |

\* cited by examiner

*Primary Examiner*—Wenpeng Chen
(74) *Attorney, Agent, or Firm*—Birch, Stewart, Kolasch & Birch, LLP

(57) ABSTRACT

A histogram of a digital image signal representing a color image is formed, and a dynamic range of the image signal is calculated in accordance with the histogram. A rate of dynamic range compression corresponding to a region of the image signal, in which the signal value is comparatively large, a region of the image signal, in which the signal value is comparatively small, and/or the entire region of the image signal, is set in accordance with the dynamic range and by taking a predetermined reference level of the image signal as reference. A dynamic range compressing process is carried out on the image signal with the rate of dynamic range compression having thus been set. Gradation processing is carried out on an image signal, which has been obtained from the dynamic range compressing process, and a processed image signal is thereby obtained. A visible image is then reproduced from the processed image signal.

6 Claims, 11 Drawing Sheets

F I G. 12A
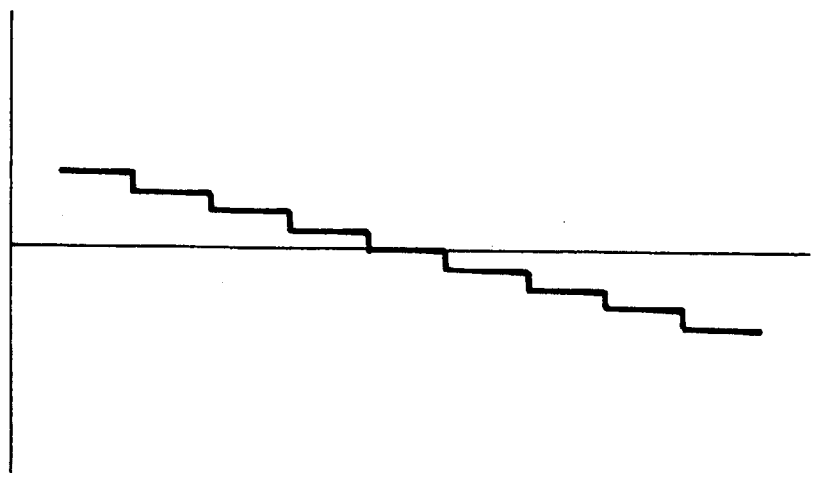
F I G. 12B
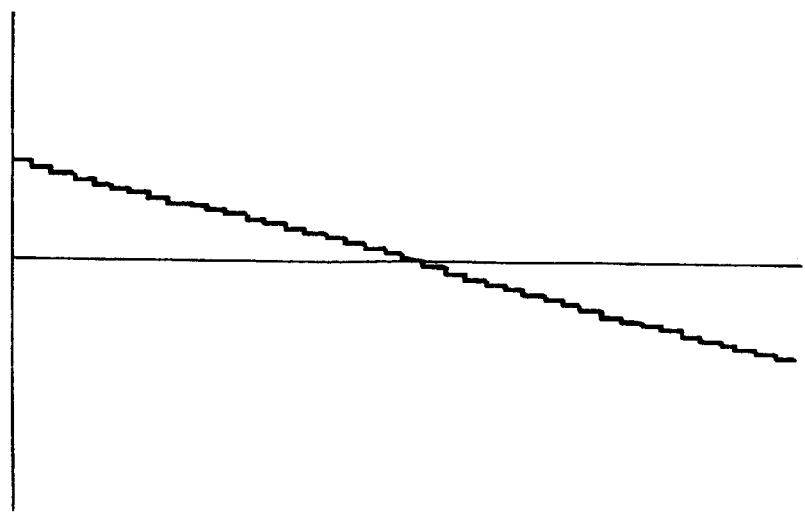

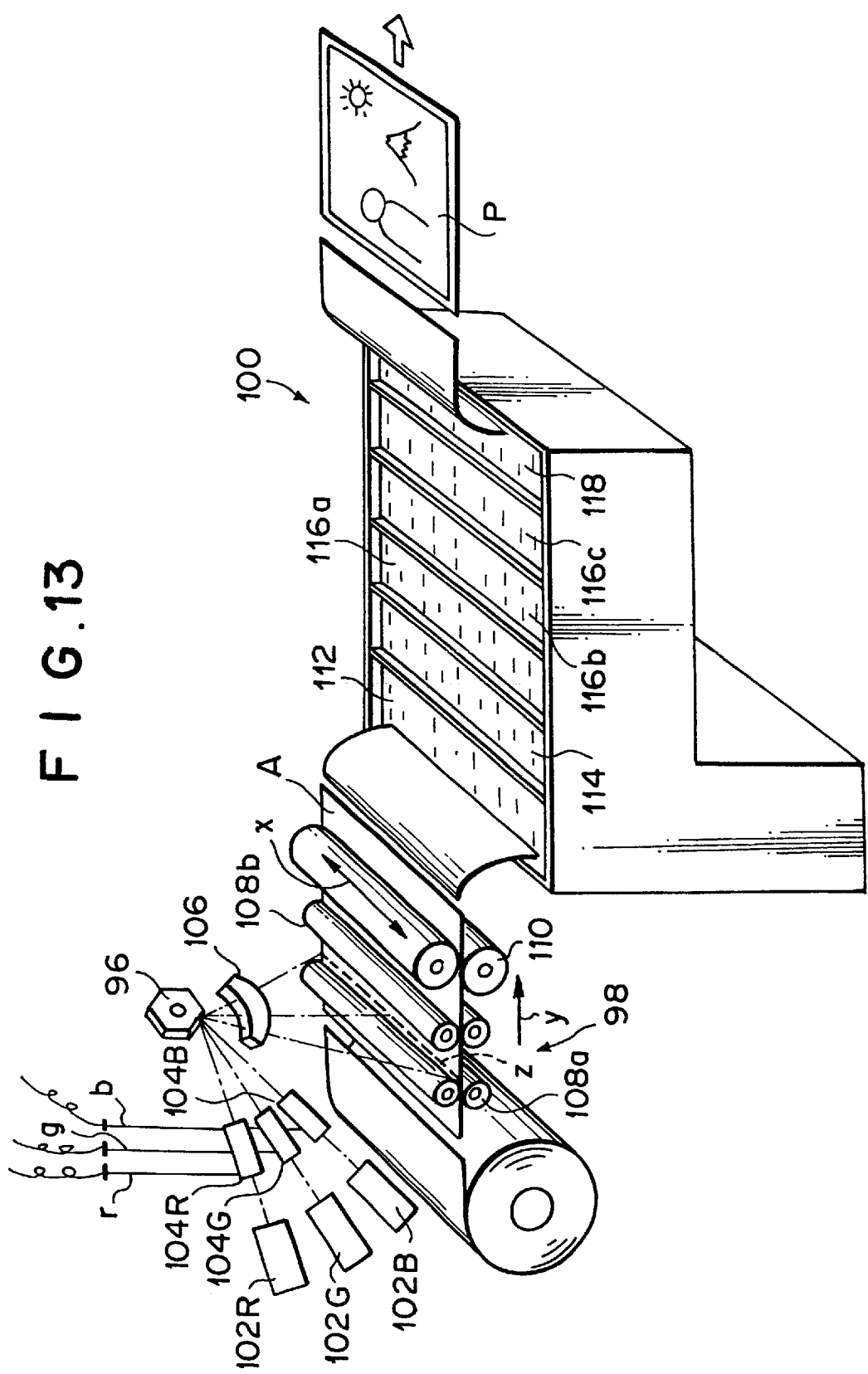

IMAGE REPRODUCING METHOD AND APPARATUS

This application is a continuation of application Ser. No. 08/741,722, filed on Oct. 31, 1996, now U.S. Pat. No. 6,101,273 the entire content of which are hereby incorporated by reference.

BACKGROUND OF THE INVENTION

1. Field of the Invention

This invention relates to an image reproducing method and apparatus for reproducing a visible image from an image signal, which is obtained from a color image carried on a reflection type of image storage sheet, such as a photograph or printed matter, or a transmission type of image storage sheet, such as negative film or reversal film.

2. Description of the Prior Art

Recently, research of digital photo printers has been carried out. With the digital photo printers, an image having been recorded on photographic film (hereinbelow referred to as the film), such as negative film or reversal film, or on printed matter is photoelectrically read out, and an image signal having thus been obtained is converted into a digital signal. The digital signal is then subjected to various kinds of image processing, and a processed image signal is thereby obtained. Thereafter, recording light is modulated with the processed image signal, and a photosensitive material, such as photographic paper, is scanned with and exposed to the modulated recording light. In this manner, a visible image is printed on the photosensitive material.

With the digital photo printers, layouts of printed images, such as combining of a plurality of images, division of an image, and editing of characters and images, and various kinds of image processing, such as color/image density adjustment, conversion of magnification, and contour emphasis, can be carried out freely. Therefore, prints having been edited and processed freely in accordance with applications of the prints can be obtained. Also, in cases where the conventional surface exposure techniques are employed, the image density information having been recorded on film, or the like, cannot be reproduced perfectly due to limitation imposed upon the reproducible image density range of photosensitive materials. However, with the digital photo printers, prints can be obtained such that the image density information having been recorded on film, or the like, can be reproduced approximately perfectly.

Basically, the digital photo printers are constituted of a read-out means for reading out an image having been recorded on an image storage sheet, such as film, and an image reproducing means. The image reproducing means carries out image processing on the image signal having thus been detected by the read-out means, and adjusts exposure conditions. Also, the image reproducing means carries out a scanning exposure operation on a photosensitive material under the adjusted exposure conditions and carries out development processing on the exposed photosensitive material. Further, the image reproducing means can reproduce a visible image from the image signal having been obtained from the image processing and can display the visible image on a monitor.

For example, in a read-out apparatus for reading out an image having been recorded on film, or the like, wherein slit scanning is carried out, reading light having a slit-like shape extending in a one-dimensional direction is irradiated to the film, and the film is moved in a direction, which is approximately normal to the one-dimensional direction. (Alternatively, the reading light and a photoelectric converting device are moved in the direction, which is approximately normal to the one-dimensional direction.) In this manner, the film is scanned in two-dimensional directions. An image of the light, which has passed through the film and carries the film image information, is formed on a light receiving face of the photoelectric converting device, such as a CCD line sensor, and is thus photoelectrically converted into a light amount signal. The thus detected light amount signal is amplified and is then converted into a digital signal by an analog-to-digital converter. Thereafter, the digital signal is subjected to various kinds of image processing, such as compensation for a fluctuation in the characteristics among the CCD elements of the CCD line sensor, image density conversion, and conversion of magnification, and a processed signal obtained from the image processing is transferred to a reproducing means.

In the reproducing means, for example, a visible image is reproduced from the received image signal and displayed on a display device, such as a cathode ray tube (CRT) display device. When necessary, the operator, who views the reproduced image, corrects the gradation, the color, the image density, or the like, of the reproduced image (i.e., sets the set-up conditions). In cases where the reproduced image is judged as being acceptable as a finished print, the image signal is transferred as the recording image information into a development means or a monitor.

In an image reproducing apparatus, in which the image reproduction with raster scanning (i.e., light beam scanning) is utilized, three kinds of light beams corresponding to exposure of the layers, which are formed on a photosensitive material and are sensitive to three primary colors, e.g. red (R), green (G), and blue (B), are modulated in accordance with the recording image information and deflected in a main scanning direction (which corresponds to the aforesaid one-dimensional direction). Also, the photosensitive material is conveyed in a sub-scanning direction, which is approximately normal to the main scanning direction. (The photosensitive material is thus moved with respect to the deflected light beams and in the sub-scanning direction.) In this manner, the photosensitive material is scanned in two-dimensional directions with the light beams, which have been modulated in accordance with the recording image information, and the image having been read out from the film is thereby reproduced on the photosensitive material.

The photosensitive material having thus been scanned with and exposed to the light beams is then subjected to development processing in accordance with the kind of the photosensitive material. For example, in cases where the photosensitive material is a silver halide photographic material, it is subjected to the development processing comprising the steps of color development, bleach-fix, washing, drying, and the like. A finished print is thereby obtained.

Such a photosensitive material can record a comparatively wide range of luminance of the object. However, the maximum image density on the photosensitive material is limited. Therefore, in cases where a print of a scene having a large difference in luminance is obtained with an ordinary printing technique, details become imperceptible due to insufficient gradation in either one of a bright portion (a highlight) and a dark portion (a shadow) on the print. For example, in cases where a picture of a person is taken against the light, if the picture is printed such that the image of the person may become clear, the bright portion, such as the sky region, will become white and its details will become imperceptible. Also, if the picture is printed such that the bright portion, such as the sky region, may become clear, the image of the person will become black and its details will become imperceptible. In order to solve the problems, a shutting light technique or a masking print technique has heretofore been employed.

With the shutting light technique, an ordinary level of exposure is given to a region having an intermediate level of image density in a scene. Also, a long time of exposure is given selectively to a region, which is considered to become white and the details of which are considered to become imperceptible on the print, by using a perforated blocking sheet. Further, as for a region, which is considered to become black and the details of which are considered to become imperceptible on the print, the exposure time is kept short selectively by using a blocking sheet. In this manner, the print is obtained such that the contrast of each object may be kept appropriate, and the details of the highlight and the shadow may be kept perceptible. A method has been proposed, in which unsharp image film having been photographically formed by the negative-positive reversal of original image film is used as a blocking sheet for locally controlling the exposure time, and in which the printing is carried out by superposing the original image film and the unsharp image film one upon the other.

Also, various masking print techniques have been proposed in, for example, Japanese Unexamined Patent Publication Nos. 58(1983)-66929 and 64(1989)-35542 and Japanese Patent Publication No. 64(1989)-10819. With the proposed masking print techniques, the same effects as those of the shutting light technique can be obtained by locally changing the brightness of a light source for illuminating a photographic original image. With the apparatus proposed in Japanese Unexamined Patent Publication No. 58(1983)-66929, a CRT is employed as the illuminating light source, and a photometric operation with memory scanning is carried out on an original image. In this manner, an unsharp mask signal is formed from the color original image. In an exposure mode, a CRT is controlled with the unsharp mask signal, and the contrast is thereby controlled such that the original image may be reliably recorded within the contrast reproduction limit of a photosensitive material.

With the apparatus proposed in Japanese Unexamined Patent Publication No. 64(1989)-35542, a CRT is employed as the illuminating light source, and an optical path for the photometric operation carried out on an original image and an optical path for the exposure of a photosensitive material are provided such that they may be changed over to each other. Also, a signal for controlling the luminance of the CRT during the exposure and thereby correcting the gradation and the saturation of the reproduced image is formed in accordance with the photometric signal obtained from the original image. Further, a signal for displaying the reproduced image on a monitor is formed. The image displayed on the monitor is viewed, and the amount of light of the CRT is thereby controlled such that a desired image may be reproduced.

With the apparatus proposed in Japanese Patent Publication No. 64(1989)-10819, a matrix device, such as a liquid crystal, which is capable of locally changing the light transmittance, is located between a uniform surface light source and an original image. The transmittance of the liquid crystal is controlled in accordance with the photometric signal obtained from the original image, and the contrast of the reproduced image is thereby adjusted.

Further, for example, in Japanese Unexamined Patent Publication No. 6(1994)-242521, a method is proposed wherein, in order for the gray balance in image reproduction to be corrected, conversion is carried out such that the maximum image density value and the minimum image density value of each color on an original image may become equal to predetermined values on the reproduced image. With the proposed method, the control of the gradation can be carried out for each of the frames of film. Therefore, as for a scene having a large difference in luminance, the gradation of the entire area of the image can be rendered soft such that the range of luminance of the scene may fall within the dynamic range of the photosensitive material. In this manner, the problems can be prevented from occurring in that the details of the highlight and the shadow become imperceptible due to insufficient gradation.

However, with the aforesaid shutting light technique and the aforesaid masking print techniques, the blocking sheet having been prepared regardless of the image, which is to be reproduced, must be operated. Therefore, a very high level of operation technique is required. Also, considerable labor and time are required to form the unsharp image film, and the printing efficiency cannot be kept high.

Also, with the aforesaid apparatuses described in Japanese Unexamined Patent Publication Nos. 58(1983)-66929 and 64(1989)-35542 and Japanese Patent Publication No. 64(1989)-10819, the contrast of a comparatively large structure can be reproduced by adjusting with the distribution of the luminance of the illuminating light source. However, local structures in the reproduced image correspond to the projected image of the original image film. Therefore, the aforesaid apparatuses have the drawbacks in that the reproduction of colors of the local structures, including their edges, cannot be controlled freely, in that the sharpness of the edges cannot be controlled freely, and in that the gradation of over-exposure portions, under-exposure portions, or the like, in the original image cannot be controlled freely.

Further, with the aforesaid apparatuses described in Japanese Unexamined Patent Publication Nos. 58(1983)-66929 and 64(1989)-35542 and Japanese Patent Publication No. 64(1989)-10819, the processing for the photometric operation and the exposure is carried out sequentially. Therefore, the problems occur in that the processing capacity cannot be kept high. Also, the problems occur in that, in cases where the distance of movement of the original image becomes different between when the photometric operation is carried out and when the exposure is carried out, the printed image becomes disturbed. Further, with the apparatus described in Japanese Patent Publication No. 64(1989)-10819, wherein the liquid crystal is used, since the transmittance of the liquid crystal is at most approximately 30%, the exposure time cannot be kept short. Furthermore, the tube surface of the CRT is covered with glass, and the side inward from An the glass becomes luminous. Therefore, even if the film is brought into close contact with the tube surface of the CRT, a spacing will substantially occur between the luminous surface of the CRT and the film. Accordingly, with the apparatus proposed in Japanese Unexamined Patent Publication No. 64(1989)-35542, wherein the image represented by the photometric signal is displayed, a blur occurs with the photometric and image forming system due to the spacing between the luminous surface of the CRT and the film surface during the photometric operation, and therefore a clear monitor image cannot be obtained.

With the method proposed in Japanese Unexamined Patent Publication No. 6(1994)-242521, even though the problems can be prevented from occurring in that the details of the highlight and the shadow become imperceptible due to insufficient gradation, the problems occur in that the contrast of each object becomes weak and the printed image becomes monotonous.

Therefore, novel image reproducing methods have been proposed, wherein an unsharp image signal, which represents only the structures of low frequencies in a color image, is subtracted from a digital image signal representing the color image, a difference signal being thereby obtained, processing for changing the image density, the saturation, and/or the gradation is carried out on the difference signal, and a visible image is reproduced by an image reproducing means from a processed image signal, which has been obtained from the processing carried out on the difference signal. In this manner, even if the contrast of the entire area of the original image is strong, a reproduced image can be obtained such that the contrast of the entire area of the image may be weakened, such that the contrasts of fine structures in the highlight and the shadow in the image may remain, and such that the details of the highlight and the shadow can be prevented from becoming imperceptible in the reproduced image due to insufficient gradation. Such image reproducing methods are described in, for example, Japanese Unexamined Patent Publication No. 2(1990)-226375 and U.S. Ser. No. 08/672,939.

However, with the proposed image reproducing methods, even though the dynamic range of the entire image can be compressed, the problems occur in that the dynamic range compressing process is carried out also on a scene, in which the large area contrast is weak and which need not be subjected to the dynamic range compression. Therefore, the entire area of the image becomes monotonous, and the image becomes imperceptible.

Also, several scenes have the characteristics such that the histogram of the image signal representing the scene is biased to the bright side or the dark side. As for such scenes, the dynamic range compressing process should preferably be carried out on only either one of the highlight and the shadow. However, with the conventional methods, the dynamic range compressing process is carried out uniformly over the entire area of the image, and therefore the image portion, in which the large area contrast is weak, becomes monotonous, and an image having a high perceptibility cannot be obtained.

SUMMARY OF THE INVENTION

The primary object of the present invention is to provide an image reproducing method wherein, even if an original image has a strong low frequency contrast, the details of a highlight and a shadow are prevented from becoming imperceptible in a printed image due to insufficient gradation, the printed image is prevented from becoming monotonous, adverse effects of a dynamic range compressing process are prevented from occurring on a scene having a weak low frequency contrast, and the printed image having good image quality is thereby obtained.

Another object of the present invention is to provide an image reproducing method, wherein the color reproducibility in a printed image is enhanced such that an unnatural feeling may not occur at portions in the vicinity of edges in the printed image, and wherein the printed image having good image quality is thereby obtained even from an original image having a strong large area contrast.

The specific object of the present invention is to provide an apparatus for carrying out the image reproducing method.

The present invention provides an image reproducing method, wherein a visible image is reproduced from a digital image signal representing a color image, the method comprising the steps of:

i) forming a histogram of the image signal, ii) calculating a dynamic range of the image signal in accordance with the histogram, iii) setting a rate of dynamic range compression corresponding to a region of the image signal, in which the signal value is comparatively large, a region of the image signal, in which the signal value is comparatively small, and/or the entire region of the image signal, the rate of dynamic range compression being set in accordance with the dynamic range and by taking a predetermined reference level of the image signal as reference (such that the rate of dynamic range compression may become equal to approximately zero with respect to the reference level), .

iv) carrying out a dynamic range compressing process on the image signal with the rate of dynamic range compression having thus been set, v) carrying out gradation processing on an image signal, which has been obtained from the dynamic range compressing process, a processed image signal being obtained from the gradation processing, and vi) reproducing a visible image from the processed image signal.

The present invention also provides an image reproducing apparatus, wherein a visible image is reproduced from a digital image signal representing a color image, the apparatus comprising:

i) a histogram forming means for forming a histogram of the image signal, ii) a dynamic range calculating means for calculating a dynamic range of the image signal in accordance with the histogram, iii) a compression rate setting means for setting a rate of dynamic range compression corresponding to a region of the image signal, in which the signal value is comparatively large, a region of the image signal, in which the signal value is comparatively small, and/or the entire region of the image signal, the rate of dynamic range compression being set in accordance with the dynamic range and by taking a predetermined reference level of the image signal as reference, iv) a dynamic range compressing process means for carrying out a dynamic range compressing process on the image signal with the rate of dynamic range compression having thus been set, v) a gradation processing means for carrying out gradation processing on an image signal, which has been obtained from the dynamic range compressing process, and thereby obtaining a processed image signal, and vi) a reproducing means for reproducing a visible image from the processed image signal.

In the image reproducing method and apparatus in accordance with the present invention, the dynamic range a compressing process should preferably be carried out only when the dynamic range is larger than a predetermined threshold value.

Also, the image reproducing method and apparatus in accordance with the present invention should preferably be modified such that a preliminary read-out image signal, which represents picture elements detected at coarser intervals than in the image signal, may be obtained before the image signal is obtained, and the calculation of the dynamic range and the setting of the rate of dynamic range compression may be carried out in accordance with the preliminary read-out image signal.

Further, the image reproducing method and apparatus in accordance with the present invention should preferably be modified such that the image signal may be converted into a luminance, an unsharp image signal, which represents an unsharp image of the image represented by the luminance, may be formed, and the calculation of the dynamic range, the setting of the rate of dynamic range compression, and the dynamic range compressing process may be carried out in accordance with the unsharp image signal.

Furthermore, the image reproducing method and apparatus in accordance with the present invention should preferably be modified such that the dynamic range compressing process may be carried out by setting the number of bits of the image signal, which is subjected to the dynamic range compressing process, to be larger than the number of bits of the processed image signal. In particular, in cases where the processing is carried out in accordance with the unsharp image signal, the bit width of the signal subjected to the processing should preferably be set to be wider than the bit width of the input image signal such that an false contouring may not occur due to insufficient quantization level of the dynamic range compressed signal.

With the image reproducing method and apparatus in accordance with the present invention, the histogram of the image signal is formed, and the dynamic range of the image signal is calculated from the histogram. The rate of dynamic range compression corresponding to the region of the image signal, in which the signal value is comparatively large, the region of the image signal, in which the signal value is comparatively small, and/or the entire region of the image signal is set in accordance with the dynamic range and by taking the predetermined reference level of the image signal as reference. The dynamic range compressing process is then carried out on the image signal by using the rate of dynamic range compression having thus been set. The region of the image signal, in which the signal value is large, corresponds to the highlight in the reproduced image, and the region of the image signal, in which the signal value is small, corresponds to the shadow in the reproduced image. Therefore, in cases where the rates of dynamic range compression are set such that the dynamic range compressing process may be carried out on only the highlight and the shadow, the details of which are apt to become imperceptible due to insufficient gradation, the dynamic range compressing process can be carried out on only the image portion, in which the large area contrast is strong. As a result, the large area contrast is weakened only for the highlight or the shadow, and the dynamic range compressing process is not carried out on the image portion, in which the large area contrast is weak. Therefore, the details of the highlight and the shadow do not become imperceptible, and the contrast of the image portion, in which the large area contrast is weak, is not weakened. Accordingly, a reproduced image having good image quality can be obtained.

As for the reference level of the image signal, the rate of dynamic range compression is set to be equal to approximately zero. Therefore, in cases where the image density of the primary object in the image is set as the reference level, the dynamic range compressing process is not carried out for the primary object. Also, the adjustment of the brightness of the entire area of the image may be carried out independently. In this manner, the function for the dynamic range compression and the function for the brightness adjustment can be separated clearly, and the correction of brightness, or the like, can be carried out easily.

Also, in cases where the dynamic range compressing process is carried out only when the dynamic range having been calculated from the histogram is larger than the predetermined threshold value, the dynamic range compressing process is not carried out when the dynamic range is smaller than the predetermined threshold value. As a result, as for an image in which the dynamic range is small and the large area contrast is weak, the dynamic range compressing process can be prevented from being carried out. Therefore, the large area contrast of the image, in which the large area contrast is weak, can be prevented from being weakened.

Further, with the image reproducing method and apparatus in accordance with the present invention, the unsharp image signal may be formed by converting the image signal into the luminance, and subjecting the luminance to filtering processing, or the like. The dynamic range compressing process may then be carried out on the unsharp image signal. In such cases, the image reproduced from the processed image signal is obtained such that the color reproducibility may be kept good, even though the brightness at the edge of an object in the image may become different from the brightness in the color image. Therefore, an image can be obtained which is free from an unnatural feeling in comparison with the original color image.

Furthermore, in cases where the bit width of the image signal, which is subjected to the dynamic range compressing process, is set to be larger than the bit width of the processed image signal, a false contouring can be prevented from occurring due to insufficient quantization level, and an image having good image quality can be obtained.

BRIEF DESCRIPTION OF THE DRAWINGS

FIG. 12A is a graph showing a pattern of an image signal obtained from the image processing with the 8-bit signal, FIG. 12B is a graph showing a pattern of an image signal obtained from the image processing with the 10-bit signal, FIG. 13 is a perspective view showing a developing section.

DESCRIPTION OF THE PREFERRED EMBODIMENTS

The present invention will hereinbelow be described in further detail with reference to the accompanying drawings.

Figure 1:
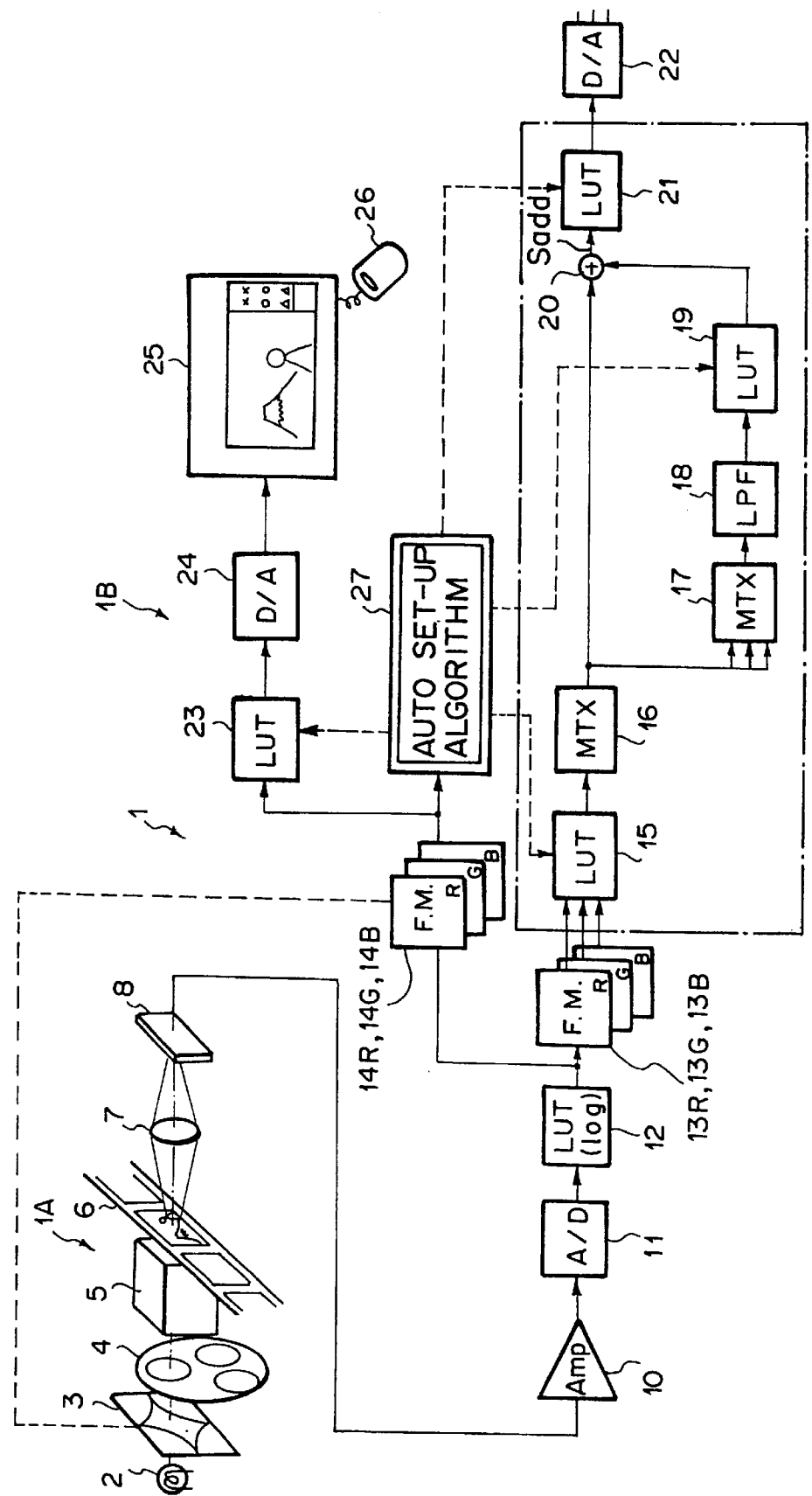
FIG. 1 is an explanatory view showing an embodiment of the image reproducing apparatus in accordance with the present invention.

FIG. 1 is an explanatory view showing an embodiment of the image reproducing apparatus in accordance with the present invention. As illustrated in FIG. 1, an image reproducing apparatus 1, which is the embodiment of the image reproducing apparatus in accordance with the present invention, comprises an image read-out section 1A and an image processing section 1B. The image read-out section 1A comprises a light source 2, and a light regulating device 3 for adjusting the amount of light having been produced by the light source 2. The image read-out section 1A also comprises an RGB filter 4 for converting the light, which has been produced by the light source 2, into R, G, and B three colors, and a mirror box 5 for diffusing the light, which has passed through the RGB filter 4, and irradiating it to film 6. The image read-out section 1A further comprises a lens 7 for forming an image of the light, which has passed through the film 6, on an area type of CCD image sensor 8. In this embodiment, the image read-out operation is carried out with the area type of CCD image sensor 8. Alternatively, a technique for moving a line sensor with respect to the light may be employed. As another alternative, a technique for spot photometry using a drum scanner, or the like, may be employed. In the image read-out section 1A, a preliminary read-out operation and a final read-out operation are carried out. In the preliminary read-out operation, the detection intervals of the CCD image sensor 8 are set to be comparatively coarse, and a preliminary read-out image signal $S_P$ is thereby obtained. After the preliminary read-out operation has been carried out, the final read-out operation is carried out. In the final read-out operation, the detection intervals of the CCD image sensor 8 are set to be comparatively fine, and a final read-out:image signal $S_Q$ is thereby obtained.

Figure 2A:
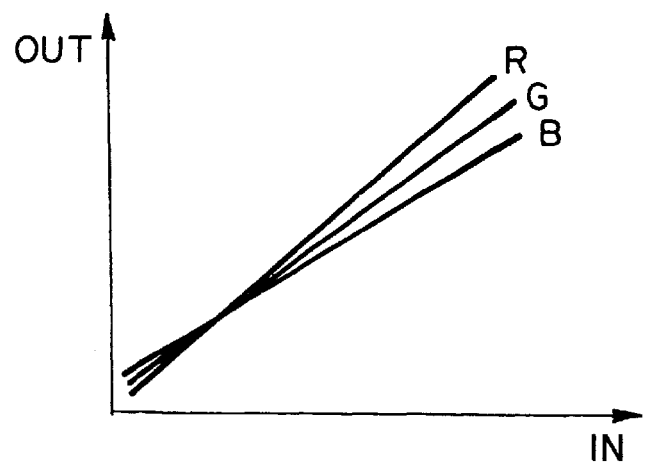
FIG. 2A is a graph showing a table for gray balance adjustment carried out in an LUT 15.
Figure 2B:
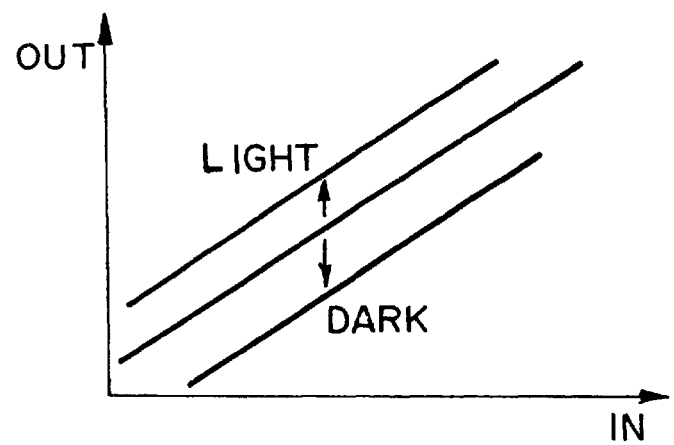
FIG. 2B is a graph showing a table for brightness correction carried out in the LUT 15.
Figure 2C:
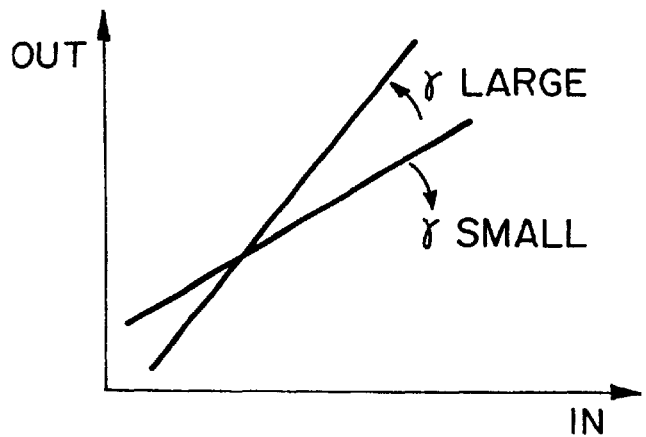
FIG. 2C is a graph showing a table for gradation conversion carried out in the LUT 15.
Figure 3A:
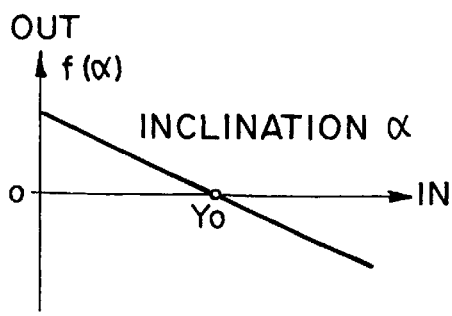
FIGS. 3A, 3B, 3C, 3D, and 3E are graphs showing tables for a dynamic range compressing process carried out in an LUT 19.

The image processing section 1B comprises an amplifier 10 for amplifying the R, G, and B three color image signals, which have been detected by the CCD image sensor 8, and an analog-to-digital converter 11 for converting the amplified image signals into digital image signals. The image processing section 1B also comprises a look-up table (LUT) 12 for converting the digital image signals into image density signals, and frame memories 13R, 13G, and 13B, which respectively store the R, G, and B digital image signals having been converted into the image density signals. The image processing section 1B further comprises frame memories 14R, 14G, and 14B for respectively storing R. G, and B preliminary read-out image signals $S_P$, which are obtained in cases where the preliminary read-out operation is carried out. The image processing section 1B still further comprises an LUT 15 for carrying out correction of gray balance, brightness, and gradation, which will be described later, on the digital image signals, and a matrix (MTX) 16 for correcting the image signals, which have been obtained from the processing carried out by the LUT 15, such that they may become the color signals capable of being reproduced in appropriate colors on a photosensitive material, which will be described later. The image processing section 1B also comprises an MTX 17 for converting the image signals, which have been corrected by the MTX 16, into a luminance, and a low-pass filter (LPF) 18 for forming an unsharp signal from the luminance. The image processing section 1B further comprises an LUT 19 for compressing the dynamic range of the unsharp signal and thereby obtaining an unsharp image signal for the adjustment of the large area contrast, and an adder 20 for adding the original image signals and the unsharp image signal, which has been obtained from the dynamic range compressing process, to each other and thereby obtaining addition signals Sadd. The image processing section 1B still further comprises an LUT 21 for correcting the contrast (i.e., the large area contrast and the high frequency contrast) of the addition signals Sadd, i.e. for carrying out a gradation processing, and a digital-to-analog converter 22 for converting the signals, which have been obtained from the contrast correction, into analog signals. The image processing section 1B also comprises an LUT 23 for correcting the gradation of the preliminary read-out image signals $S_P$, and a digital-to-analog converter 24 for converting the preliminary read-out image signals $S_P$, which have been obtained from the gradation correction carried out by the LUT 23, into analog signals. The image processing section 1B further comprises a CRT display device 25 for reproducing a visible image from the preliminary read-out image signals $S_P$ having been obtained from the digital-to-analog conversion, and a mouse device 26 for operating the visible image, which is displayed on the CRT display device 25, in order to set ultimate parameters for the image. The image processing section 1B still further comprises an automatic set-up algorithm device 27 for calculating the histogram of the preliminary read-out image signals $S_P$ in the manner, which will be described later, and setting the parameters for the adjustments of the LUT 15, the LUT 19, the LUT 21, and the LUT 23 in accordance with the histogram. The LUT 12 is a transmittance-to-image density conversion table for converting the signals such that saturation may not be reached with respect to the image density range of the original image. The LUT 15 corrects the gray balance, the brightness, and the gradation. The LUT 15 comprises a gray balance adjustment table shown in FIG. 2A, a brightness correction table shown in FIG. 2B, and a γ correction table shown in FIG. 2C, which are connected in series. The LUT 19 stores dynamic range compression tables having predetermined inclinations α shown in FIGS. 3A, 3B, 3C, 3D, and 3E. In this embodiment, α takes a negative value. As will be described later, the dynamic range compression tables are calculated in accordance with the preliminary read-out image signals $S_P$. As illustrated in FIG. 4, the LUT 21 is a non-linear gradation conversion table and represents the relationship between the input signal and a processed image signal representing the reproduced image. The LUT 23 stores a linear gradation conversion table shown in FIG. 5. The inclination of the linear gradation conversion table is equal to 1+α.

The MTX 16 corrects the detected digital image signals such that they may become the color signals capable of being reproduced in appropriate colors on the photosensitive material. Specifically, the MTX 16 corrects the detected digital image signals such that they may be reproduced in appropriate colors by the combination of the spectral characteristics of the film 6 and the spectral characteristics of the photosensitive material, on which the visible image is reproduced ultimately. The MTX 17 converts the R, G, and B color image signals into a luminance. Specifically, the MTX 15 converts the R, G, and B color image signals into the luminance by using a value of one-third of the mean value of each color image signal or by using the YIQ base, or the like.

Figure 6:
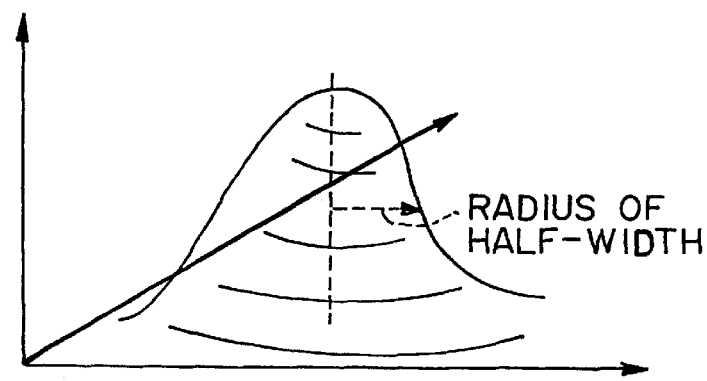
FIG. 6 is a graph showing the characteristics of a low-pass filter.

The LPF 18 is the unsharp mask filter for blurring the luminance in two-dimensional directions and has the characteristics illustrated in FIG. 6. If the diameter of the unsharp mask is very small, the sharpness will be emphasized unnaturally, or overshooting of an edge in the image will become perceptible. If the diameter of the unsharp mask is very large, the drawbacks will occur in that the effects of the unsharp mask cannot be obtained appropriately when the primary object pattern is small, or in that a large amount of calculation is required and the scale of the apparatus cannot be kept small. Experiments carried out by the inventor with respect to various kinds of scenes revealed that, as for the 135 film, the diameter of the half-width of the mask size should preferably fall within the range of approximately 0.3 mm to approximately 3 mm on the film, and should more preferably fall within the range of approximately 0.5 mm to approximately 2 mm on the film. In cases where the film size is larger than the 135 film, the unsharp mask size should preferably be increased.

How the embodiment of the image reproducing apparatus in accordance with the present invention operates will be described hereinbelow.

Firstly, the light is produced by the light source 2 of the image read-out section 1A. The light is converted to a predetermined amount of light by the light regulating device 3. By way of example, the amount of light, which has passed through the minimum image density point in the image having been recorded on the film 6, is measured previously, and the light regulating device 3 adjusts the amount of light having been produced by the light source 2 such that the amount of light, which has passed through the minimum image density point in the image, may be slightly lower than the saturation level of the CCD image sensor 8. The light having been adjusted by the light regulating device 3 passes through the RGB filter 4, is diffused by the mirror box 5, and then impinges upon the film 6. The light passes through the film 6 and is thus modulated in accordance with the image information having been recorded on the film 6. Thereafter, the light passes through the lens 7 and impinges upon the CCD image sensor 8. In this manner, the light is photoelectrically converted by the CCD image sensor 8 into an image signal, which represents the image having been recorded on the film 6. In this embodiment, firstly, in order for the preliminary read-out image signals $S_P$ to be obtained, the detection intervals of the CCD image sensor 8 are set to be comparatively coarse. The RGB filter 4 is changed over to R, G, and B, and three color preliminary read-out image signals $S_P$ representing the color image are thereby obtained. The three color preliminary read-out image signals $S_P$ are fed into the image processing section 1B. At the image processing section 1B, the processing is carried out in the manner described below.

The preliminary read-out image signals $S_P$ obtained at the image read-out section 1A are weak, and are therefore amplified by the amplifier 10. The image signals are then converted into the digital preliminary read-out image signals $S_P$ by the analog-to-digital converter 11. The digital preliminary read-out image signals $S_P$ are converted into image density signals by the LUT 12 and are then respectively stored in the frame memories 14R, 14G, and 14B.

Thereafter, the preliminary read-out image signals Sp are read from the frame memories 14R, 14G, and 14B and are fed into the automatic set-up algorithm device 27 and the LUT 23. In the automatic set-up algorithm device 27, the processing described below is carried out.

Figure 7:
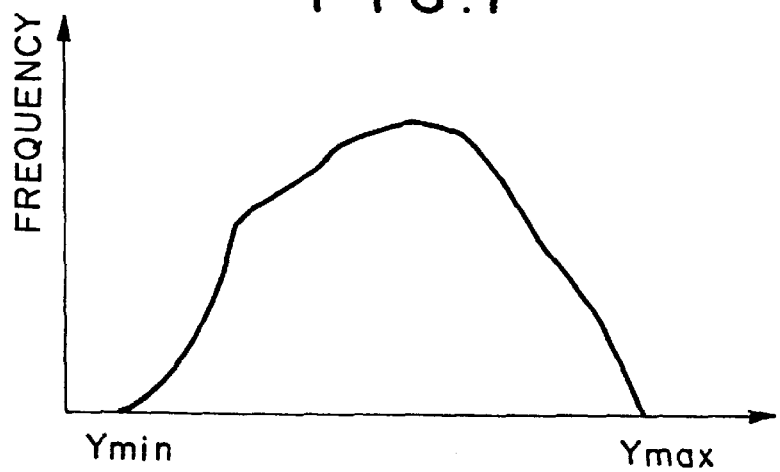
FIG. 7 is a graph showing a histogram of an image signal.

Firstly, the histogram of the preliminary read-out image signals $S_P$ is calculated. FIG. 7 shows the histogram of the preliminary read-out image signals $S_P$. From the histogram shown in FIG. 7, the maximum luminance Ymax and the minimum luminance Ymin of the R, G, and B colors are calculated. In accordance with the maximum luminance Ymax and the minimum luminance Ymin, the gray balance adjustment table shown in FIG. 2A, which is to be utilized in the LUT 15, is set.

Also, in accordance with the histogram, the dynamic range compression tables for the dynamic range compressing process, which is carried out in the LUT 19, are set. The dynamic range compression tables are set in the manner described below.

The image signal and the ultimate print density are related to each other in the manner described below. Specifically, in the gradation curve of the LUT 21 representing the relationship between the signal value and the print density, the region, in which the object image pattern can be reproduced such that the details of the object image pattern may not become imperceptible due to insufficient gradation, is the region G shown in FIG. 4. Therefore, in the digital image signal, if the object image pattern contained in the image is outside the range G, an image portion, such as a catch light portion, in which the signal value is large, will become white and its details will become imperceptible. Also, an image portion, in which the signal value is small, will become black and its details will become imperceptible. Thus the gray level of the portions of the image cannot be reproduced appropriately. Accordingly, in this embodiment, the rates of dynamic range compression are set in the manner described below such that the details of the very bright portion and the details of the very dark portion may not become imperceptible due to insufficient gradation in the print formed on the photosensitive material.

Firstly, the rates of dynamic range compression are set in accordance with the dynamic range having been calculated from the histogram shown in FIG. 7. Specifically, the rates of dynamic range compression are set such that the dynamic range, i.e. the difference between the maximum luminance Ymax and the minimum luminance Ymin of the preliminary read-out image signals $S_P$ having been calculated from the histogram shown in FIG. 7, may become identical with the signal of the range G between Ymax' and Ymin' of the LUT 21. More specifically, if the dynamic range of the image signal is larger than the range G between Ymax' and Ymin', since the value of the gradation curve y corresponding to the region of the image signal, in which the signal value is larger than Ymax' (and which represents the highlight), converges, the details of the highlight will become imperceptible due to insufficient gradation in the reproduced image. Also, since the value of the gradation curve y corresponding to the region of the image signal, in which the signal value is smaller than Ymin' (and which represents the shadow), converges, the details of the shadow will become imperceptible due to insufficient gradation in the reproduced image. Therefore, the rate of dynamic range compression $\alpha_1$ for the highlight and the rate of dynamic range compression $\alpha_d$ are set such that the details of the highlight and the shadow may not become imperceptible. Specifically, the rate of dynamic range compression $\alpha_1$ is set such that the signal in the vicinity of the maximum luminance Ymax of the preliminary read-out image signals $S_P$ may be compressed to the level not higher than Ymax'. Also, the rate of dynamic range compression $\alpha_d$ is set such that the signal in the vicinity of the minimum luminance Ymin of the preliminary read-out image signals $S_P$ may be compressed to the level not lower than Ymin'.

Figure 8:
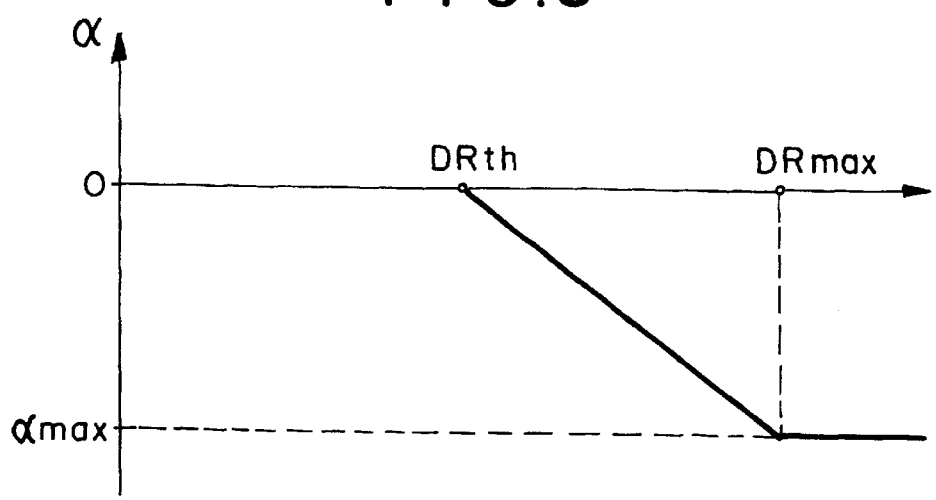
FIG. 8 is a graph showing the relationship between a dynamic range and a rate of dynamic range compression.

Further, the rate of dynamic range compression α for the entire area of the image is set with the function α(DR) shown in FIG. 8, wherein DR is an acronym for the dynamic range. The function α(DR) has the characteristics such that, in cases where the dynamic range of the image signal is smaller than a threshold value DRth, the rate of compression may be equal to zero, i.e. the dynamic range compressing process may not be carried out. This is because, in cases where the dynamic range is small and the large area contrast of the image is low, if the dynamic range compressing process is carried out, the large area contrast of the image will become even lower, and the reproduced image will become imperceptible. As for the image pattern of a highlight, such as a catch light portion, which is embedded in an image, instead of the gradation being formed with the dynamic range compressing process, the minimum image density should preferably be not reproduced in the reproduced image. Therefore, in FIG. 8, in cases where the dynamic range is larger than DRmax, α is clipped at the lower limit value αmax.

Thereafter, the tables for the dynamic range compressing process carried out in the LUT 19 are set. Firstly, the dynamic range compression table for the entire area of the image is set in accordance with the rate of compression α having been set with the function shown in FIG. 8. As illustrated in FIG. 3A, the dynamic range compression table for the entire area of the image is represented by the monotonously decreasing function in which the image signal serves as the variable. The function f(α) representing the dynamic range compression table is set by the inclination α around a signal value YO. By way of example, in cases where the object is a person and the pattern of the person is embedded in the color image, a value, which falls within the range of 0.50 to 0.70 and corresponds to approximately the same image density as the flesh color, preferably a value of 0.6, is set as the signal value YO. In cases where the signal value YO is thus set, the dynamic range compression does not affect the brightness correction with respect to the aforesaid image density, and therefore the function for the brightness correction and the function for the dynamic range compressing process can be clearly separated from each other. As a result, the setting of parameters in the automatic set-up algorithm device 27 becomes easy. Also, the advantage can be obtained in that, in cases where the brightness of the primary image portion could not be adjusted appropriately with the brightness adjusting process, the dynamic range compressing process serves such that the primary image portion may be set to be a value close to YO.

Figure 3B:
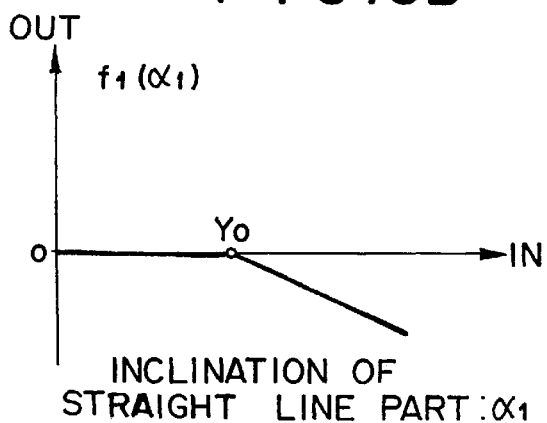
Figure 3C:
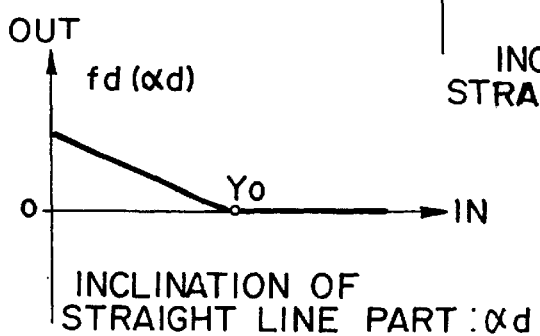
Figure 4:
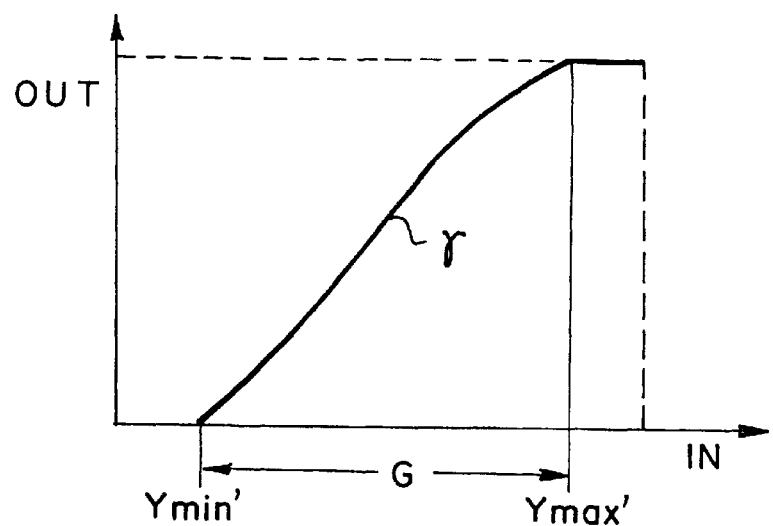
FIG. 4 is a graph showing a table for gradation conversion carried out in an LUT 21.

Also, as illustrated in FIG. 3B, a function $f_1(\alpha_1)$ representing the dynamic range compression table for the portion, in which the image signal value is large, i.e. the bright portion, is set. Further, as illustrated in FIG. 3C, a function $f_d(\alpha_d)$ representing the dynamic range compression table for the portion, in which the image signal value is small, i.e. the dark portion, is set. These functions are determined respectively by the rates of dynamic range compression $\alpha_1$ and $\alpha_d$, which have been set in the manner described above.

The functions f(α), $f_1(\alpha_1)$, and $f_d(\alpha_d)$ are added together, and a function $f_t(\alpha)$ representing an ultimate dynamic range compression table, which is to be used in the LUT 19, is thereby set. The calculation is carried out with Formula (1) shown below.

$$f_t(\alpha) = f(\alpha) + f_1(\alpha_1) + f_d(\alpha_d) \tag{1}$$

Figure 3D:
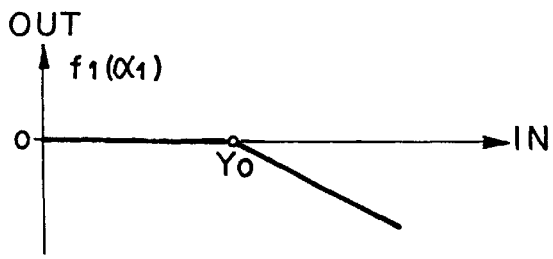
Figure 3E:
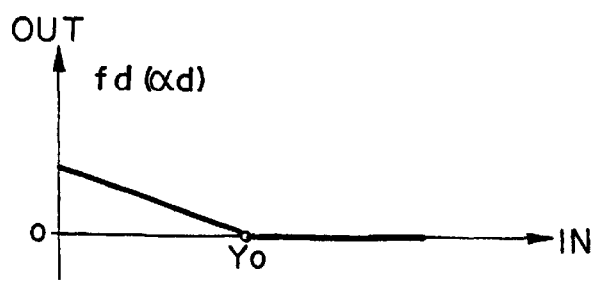

In cases where $f_1(\alpha_1)$ and $f_d(\alpha_d)$ are the functions shown in FIGS. 3D and 3E, which are discontinuous at the point YO, even if no contour is embedded in the original image, an artifact will often occur in the image density region corresponding to the point YO in the processed image. In cases where the functions $f_1(\alpha_1)$ and $f_d(\alpha_d)$ are set as shown in FIGS. 3B and 3C such that the differential coefficient may be continuous at the point YO, such an artifact can be prevented from occurring.

The functions $f_1(\alpha_1)$ and $f_d(\alpha_d)$ are the straight lines having an end point at YO. Such that the occurrence of an artifact may be restricted, they should preferably be set as shown in FIGS. 3B and 3C such that the differential coefficient may be continuous.

Figure 5:
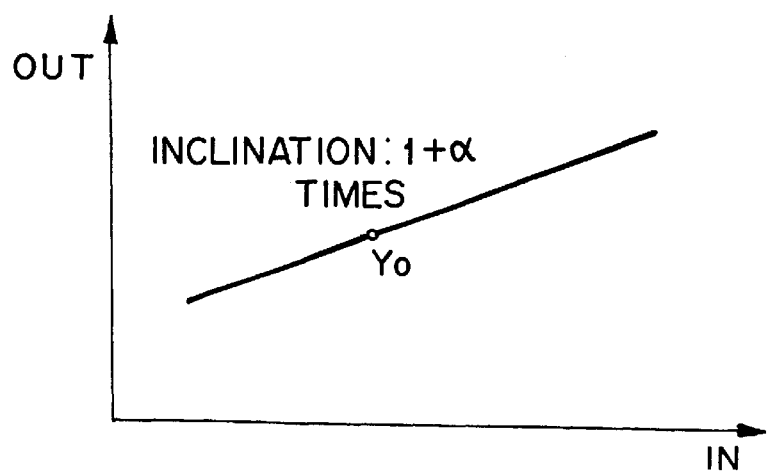
FIG. 5 is a graph showing a table for gradation conversion carried out in an LUT 23.

The rates of dynamic range compression are set in the manner described above. The dynamic range compressing process is then carried out on the preliminary read-out image signals $S_P$ by using the rates of dynamic range compression. The preliminary read-out image signals $S_P$, which have been obtained from the dynamic range compressing process, are then fed into the LUT 23. The preliminary read-out image signals $S_P$ are subjected to the gradation processing in the LUT 23, converted into analog signals by the digital-to-analog converter 24, and then used for reproducing a visible image on the monitor 25. The visible image, which is displayed on the monitor 25, is the image reproduced from the preliminary read-out image signals $S_P$. It is necessary for the effects of the dynamic range compression to be reflected on the displayed image. However, if the dynamic range compressing process is carried out on the preliminary read-out image signals $S_P$, the problems will occur in that the scale of the image reproducing system cannot be kept small. In order for the effects of the rates of dynamic range compression to be confirmed, it is only necessary that the gradation conversion be carried out on the preliminary read-out image signals $S_P$ by using a simple gradation conversion table shown in FIG. 5, in which a rate of dynamic range compression α+1 is set as the inclination, and that a visible image be reproduced from the preliminary read-out image signals $S_P$ having been obtained from the gradation conversion and displayed on the monitor 25. Therefore, the information representing the gradation conversion table shown in FIG. 5 is stored in the LUT 23. Instead of the dynamic range compressing process being carried out on the preliminary read-out image signals $S_P$, the gradation conversion is carried out on using the gradation conversion table stored in the LUT 23. A visible image is then reproduced from the resulting signals and displayed on the monitor 25. In this manner, confirmation of the effects of the rates of dynamic range compression can be carried out such that the scale of the image reproducing system does not become large.

Figure 9:
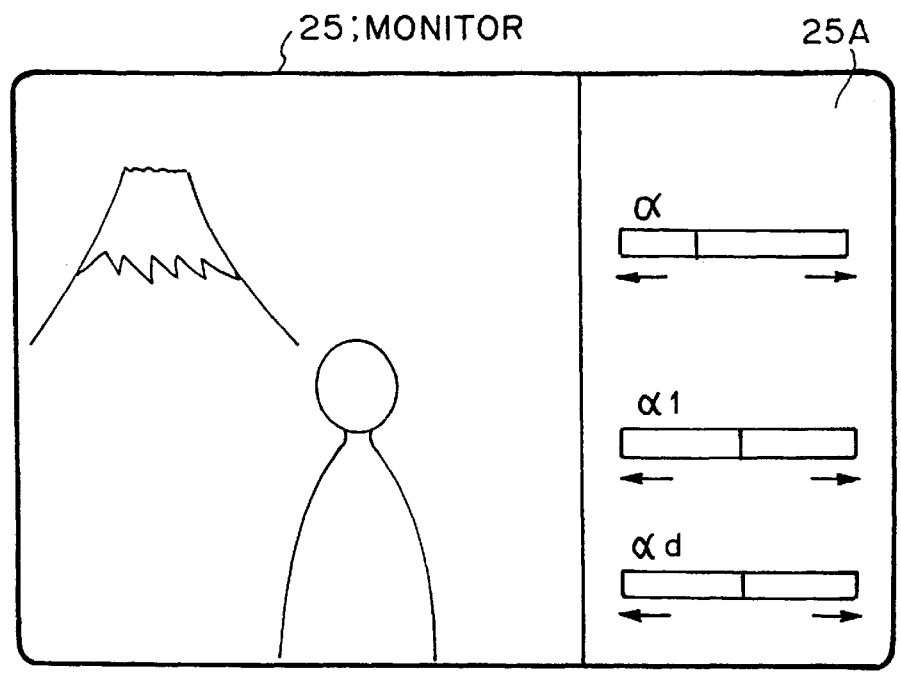
FIG. 9 is a schematic view showing an image displayed on a monitor.

FIG. 9 shows how the visible image represented by the preliminary read-out image signals $S_P$ is displayed on the monitor 25. An adjustment section 25A, in which the rates of compression of the displayed image are adjusted with the mouse device 26, is displayed on the monitor 25. The rates of compression are adjusted by operating the mouse device 26, and the scene of the image represented by the preliminary read-out image signals $S_P$ is discriminated. The rates of dynamic range compression are thereby adjusted finely. The information representing the rates of dynamic range compression having thus been adjusted is fed into the automatic set-up algorithm device 27, and the dynamic range compression tables to be used in the LUT 19 are ultimately set.

In this embodiment, the operator views the image displayed on the monitor 25 and adjusts the rates of compression having been set by the automatic set-up algorithm device 27. Alternatively, the automatic set-up algorithm device 27 may be constituted such that it may discriminates the scene of the image and may automatically adjust the rates of dynamic range compression.

After the setting of the LUT 15, the LUT 19, and the LUT 21 has thus been carried out by the automatic set-up algorithm device 27, the final read-out operation is carried out in the manner described below.

Firstly, light is produced by the light source 2 of the image read-out section 1A. The light is converted to a predetermined amount of light by the light regulating device 3. In the final read-out operation, the amount of light adjusted by the light regulating device 3 is set in accordance with the values of the preliminary read-out image signals $S_P$ having been stored in the frame memories 14R, 14G, and 14B. The light, having been adjusted by the light regulating device 3, passes through the RGB filter 4, is diffused by the mirror box 5, and then impinges upon the film 6. The light passes through the film 6 and is thus modulated in accordance with the image information having been recorded on the film 6. Thereafter, the light passes through the lens 7 and impinges upon the CCD image sensor 8. In this manner, the light is photoelectrically converted by the CCD image sensor 8 into an image signal, which represents the image having been recorded on the film 6. In this case, in order for the final read-out image signals $S_Q$ to be obtained, the detection intervals of the CCD image sensor 8 are set to be comparatively fine. The RGB filter 4 is changed over to R, G, and B, and three color final read-out image signals. $S_Q$ representing the color image are thereby obtained. The three color final read-out image signals $S_Q$ are fed into the image processing section 1B. At the image processing section 1B, the processing is carried out in the manner described below.

The final read-out image signals $S_Q$ obtained at the image read-out section 1A are weak, and are therefore amplified by the amplifier 10. The image signals are then converted into the digital final read-out image signals $S_Q$ by the analog-to-digital converter 11. The digital final read-out image signals $S_Q$ are converted into image density signals by the LUT 12 and are then respectively stored in the frame memories 13R, 13G, and 13B.

Thereafter, the final read-out image signals $S_Q$ are read from the frame memories 13R, 13G, and 13B and fed into the LUT 15. In the LUT 15, the correction of the gray balance, the correction of the brightness, and the correction of the gradation are carried out on the final read-out image signals $S_Q$ in accordance with the gray balance adjustment table shown in FIG. 2A, the brightness correction table shown in FIG. 2B, and the gradation correction table shown in FIG. 2C, which have been determined by the automatic set-up algorithm device 27. The final read-out image signals $S_Q$ having thus been corrected by the LUT 15 are fed into the MTX 16 and subjected to color correction. As described above, the MTX 16 corrects the digital image signals such that the colors may be reproduced by the combination of the spectral characteristics of the film 6 and the spectral characteristics of the photosensitive material, on which the visible image is reproduced ultimately. The final read-out image signals $S_Q$ having been obtained from the color correction carried out by the MTX 16 are fed into the adder 20 and the MTX 17. In the MTX 17, the luminance is formed from the R. G. and B signals. Specifically, the R, G, and B color image signals are converted into the luminance by using a value of one-third of the mean value of each color image signal or by using the YIQ base, or the like. For example, in cases where the luminance is to be formed with the YIQ base, only the Y components of the YIQ base are calculated from the R, G, and B signal values. The calculation is carried out with Formula (2) shown below.

$$Y=0.3R+0.59G+0.11B \quad (2)$$

The luminance, which has thus been obtained, is then converted into the unsharp mask signal by the LPF 18.

The unsharp mask signal is then fed into the LUT 19. In the LUT 19, the dynamic range compressing process is carried out in accordance with the function $f_r(\alpha)$ for the dynamic range compression, which has been set by the automatic set-up algorithm means 27. The unsharp mask signal, which has been obtained from the dynamic range compressing process, is fed into the adder 20. In the adder 20, the unsharp mask signal and the final read-out image signals $S_Q$, which have been obtained from the color correction carried out by the MTX 16, are added together, and the addition signals Sadd are thereby obtained. In the addition signals Sadd, the dynamic range of the low frequency components of the image has been compressed. The addition signals Sadd having thus been obtained are fed into the LUT 21. In the LUT 21, the gradation processing is carried out in accordance with the ultimate output medium, such as a photosensitive material. The processed image signals are obtained in this manner.

Figure 10:
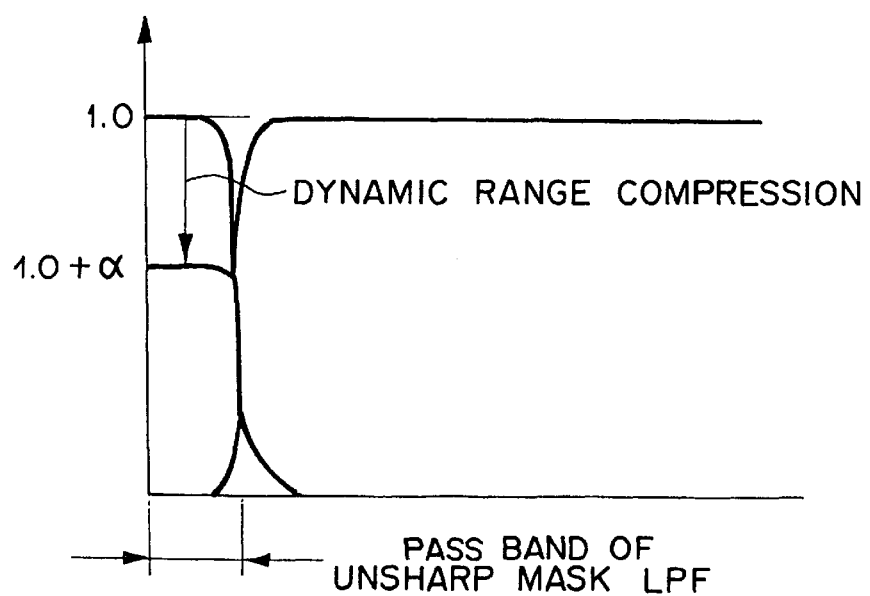
FIG. 10 is a graph showing the frequency characteristics of a processed image signal.

FIG. 10 shows the frequency characteristics of the processed image signals. As illustrated in FIG. 10, the passing band of the LPF 18 corresponds to the large area contrast. The high frequency contrast corresponds to the components of higher frequency than the passing band of the LPF 18, and therefore is not subjected to the compression with the LUT 19. Therefore, the image reproduced from the processed image signals can be obtained such that the dynamic range may have been compressed while the high frequency contrast is being kept. Thus the image processing, which corresponds to the shutting light technique in the operation of conventional analog printing, can be carried out.

Figure 11A:
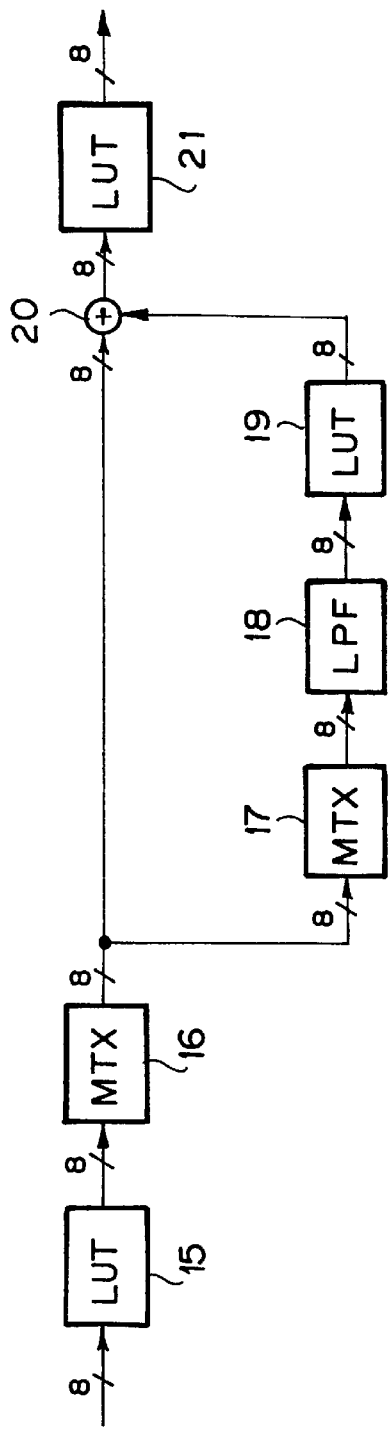
FIG. 11A is a block diagram showing an apparatus for carrying out image processing with an 8-bit signal.
Figure 11B:
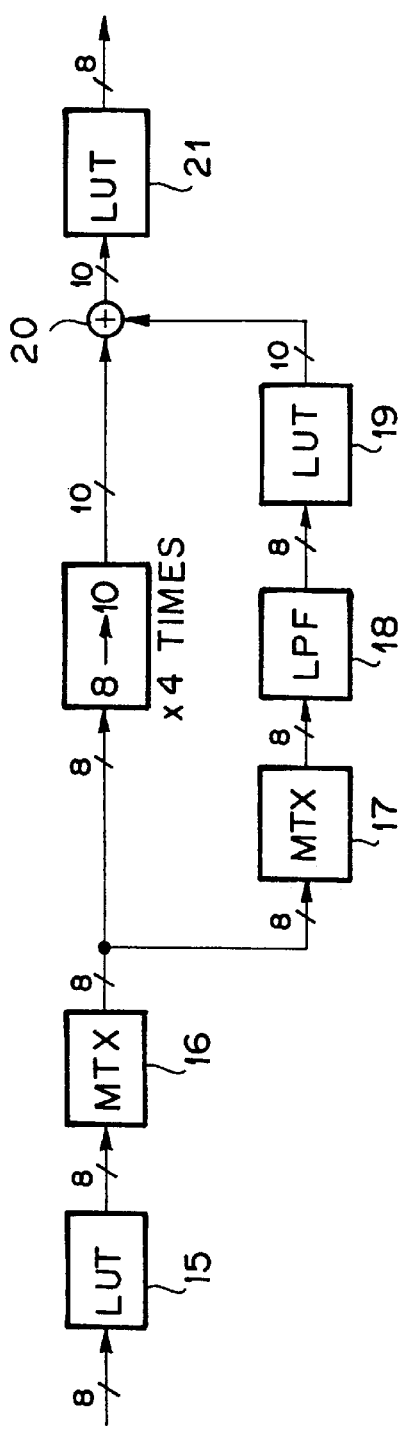
FIG. 11B is a block diagram showing an apparatus for carrying out image processing with a 10-bit signal.

FIG. 11A is a block diagram showing an apparatus for carrying out the image processing with an 8-bit signal. FIG. 11B is a block diagram showing an apparatus for carrying out the image processing with a 10-bit signal. The number of bits of the image signal is one of the important factors that determine the quantization level of the image. If the quantization level of the image is low, an artifact will occur in the reproduced image. For example, as illustrated in FIG. 11A, if the number of bits of the image signal is set to be 8 bits (256 gradation levels) in all operations, an artifact will often occur in the reproduced image. This is because, when the gradation raising process is carried out in the LUT 21, a single least significant bit (LSB) in the LUT 19 is magnified and, as a result, false contouring becomes perceptible. For example, as illustrated in FIG. 12A, in cases where the rate of dynamic range compression is equal to ¼ and 1 LSB of the 8-bit image signal is subjected to the gradation conversion in the LUT 21, when the value of γ in the LUT 21 is equal to, for example, 1.5, the amount of change in the signal per LSB is increased by a factor of approximately 1.5 in the processed signal, and therefore a step-like pattern becomes perceptible in the reproduced image. In the example illustrated in FIG. 11B, the number of bits of the image signal before being fed into the LUT 21 is converted from 8 bits to 10 bits, the gradation processing is carried out on the 10-bit image signal in the LUT 21, and the number of bits of the image signal is thereafter returned to 8 bits. In such cases, the occurrence of the artifact can be restricted. Specifically, as illustrated in FIG. 12B, in the case of the 10-bit image signal, 1 LSB obtained after the processing has been carried out by the LUT 19 becomes ¼ of 1 LSB obtained in the case of the 8-bit image signal, and therefore the signal resulting from the gradation conversion carried out by the LUT 21 becomes equal to 1.5×¼ of the dynamic range compressed signal. Accordingly, in cases where the number of bits of the image signal, which is subjected to the dynamic range compressing process in the LUT 19, is set to be at least 10 bits, the occurrence of the artifact can be restricted to a level lower than when the processing is carried out on the 8-bit image signal.

The processed image signals having thus been obtained from the LUT 21 are fed into the digital-to-analog converter 22 and converted into analog signals. The analog signals obtained from the digital-to-analog converter 22 are fed into an image-wise exposure section 98 shown in FIG. 13. At the image-wise exposure section 98, the processing described below is carried out.

The image signals having been obtained from the image processing section 1B are fed into acousto-optic modulator (AOM) drivers (not shown). The AOM drivers operate AOM's 104R, 104G, and 104B of the image-wise exposure section 98 such that light beams may be modulated in accordance with the received image signals.

At the image-wise exposure section 98, a photosensitive material A is scanned with and exposed to light with the light beam scanning (raster scanning) technique, and an image represented by the image signals is thereby reproduced on the photosensitive material A. As illustrated in FIG. 13, the image-wise exposure section 98 comprises a light source 102R for producing a light beam having wavelengths of a narrow-band range corresponding to the exposure of a red-sensitive layer of the photosensitive material A, a light source 102G for producing a light beam having wavelengths of a narrow-band range corresponding to the exposure of a green-sensitive layer of the photosensitive material A, and a light source 102B for producing a light beam having wavelengths of a narrow-band range corresponding to the exposure of a blue-sensitive layer of the photosensitive material A. The image-wise exposure section 98 also comprises the AOM's 104R, 104G, and 104B for respectively modulating the light beams, which have been produced by the light sources 102R, 102G, and 102B, in accordance with the recorded image information. The image-wise exposure section 98 further comprises a rotating polygon mirror 96 serving as a light deflector, an fθ lens 106, and a sub-scanning conveyance means 108 for conveying the photosensitive material A in a sub-scanning direction.

The light beams having been produced by the light sources 102R, 102G, and 102B travel along directions at different angles and impinge upon the corresponding AOM's 104R, 104G, and 104B. As the light sources 102R, 102G, and 102B, various types of light beam sources may be utilized, which are capable of producing the light beams having predetermined wavelengths corresponding to the sensitive layers of the photosensitive material A. For example, various types of semiconductor lasers, SHG lasers, or gas lasers, such as He-Ne lasers, may be used. Alternatively, the light sources may be constituted as a light beam combining optical system. The AOM's 104R, 104G, and 104B receive drive signals r, g, and b, which are for red, green, and blue colors and correspond to the recorded image information, from the AOM drivers. The AOM's 104R, 104G, and 104B thus modulate the intensities of the light beams, which impinge thereupon, in accordance with the recorded image information.

The light beams having been modulated by the AOM's 104R, 104G, and 104B impinge upon the rotating polygon mirror 96 serving as the light deflector and are reflected from it. The light beams are thus deflected in main scanning directions, which are indicated by the double headed arrow x in FIG. 13. Thereafter, the light beams are regulated by the fθ lens 106 such that they may be imaged in a predetermined beam shape at a predetermined scanning position z. The light beams thus impinge upon the photosensitive material A. In lieu of the rotating polygon mirror, a resonant scanner, a galvanometer mirror, or the like, may be utilized as the light deflector. Also, when necessary, the image-wise exposure section 98 may be provided with a light beam shaping means and an optical system for compensation for inclinations of the surfaces of the light deflector.

A roll of the photosensitive material A is located at a predetermined position such that it may be shielded from light. The photosensitive material A is delivered from the roll by a delivery device, such as delivery rollers, and is cut to a predetermined length by a cutter (not shown). The sub-scanning device 108 is constituted of a pair by rollers 108a, 108a and a pair of rollers 108b, 108b. The two pairs of rollers are located with the scanning position z intervening therebetween. The pair of rollers 108a, 108a and the pair of rollers 108b, 108b support the cut photosensitive material A at the scanning position z and convey it in the sub-scanning direction, which is approximately normal to the main scanning-directions and is indicated by the arrow y in FIG. 13. As described above, the light beams are deflected in the main scanning directions. Therefore, the entire area of the photosensitive material A, which is being conveyed in the sub-scanning direction, is scanned with the light beams in the two-dimensional directions. In this manner, an image represented by the image signals, which have been processed by the LUT 21, is reproduced on the photosensitive material A.

The photosensitive material A, which has been exposed to the light beams, is then conveyed by a pair of conveying rollers 110, 110 into a developing section 100. At the developing section 100, the photosensitive material A is subjected to development processing, and a finished print P is thereby obtained. For example, in cases where the photosensitive material A is a silver halide photographic material, the developing section 100 is constituted of a color development tank 112, a bleach-fix tank 114, a washing tanks 116a, 116b, and 116c, and a drying means 118. The photosensitive material A is subjected to predetermined processing in the respective processing tanks, and the finished print P is thereby obtained.

In the embodiment of FIG. 13, the light beams are modulated by the AOM's 104R, 104G, and 104B. Alternatively, in cases where light sources, such as LD's, which are capable of undergoing direct modulation, are utilized, the light beams may be directly modulated in accordance with the recorded image information. Also, in lieu of the two pairs of rollers, which are located with the scanning position intervening therebetween, a combination of an exposure drum, which supports the photosensitive material at the scanning position, and two nipping rollers, which are located with the scanning position intervening therebetween, may be utilized as the sub-scanning conveyance means.

Further, in lieu of the light beam scanning described above, a drum scanner may be utilized. In cases where the drum scanner is employed, the photosensitive material is wound around a drum, and the light beams are caused to impinge upon a single point on the photosensitive material. Also, the drum is rotated and, at the same time, is moved along the axis of the drum. As another alternative, a surface exposure operation using a surface light source and a liquid crystal shutter may be employed. As a further alternative, the exposure operation may be carried out by using a linear light source, such as an LED array. Furthermore, in the embodiment of FIG. 13, the photosensitive material is cut into a sheet before being exposed to the light beams. Alternatively, the photosensitive material may be exposed to the light beams without being cut into sheets, and may be cut into sheets before being processed at the developing section 100 or after being processed at the developing section 100.

In the manner described above, the visible image is reproduced at the developing section 100. Even if the visible image is the one reproduced from a backlighted scene, the details of the pattern of the person will not become imperceptible due to insufficient gradation in the visible image. Also, the details of the bright background pattern will not become imperceptible. Further, even if the visible image is the one reproduced from an image having been recorded by using an electronic flash, a visible reproduced image can be obtained such that both the details of a pattern of a person, which is located on the foreground side in the image, and the details of a background, which is located far away behind the pattern of the person, may be prevented from becoming imperceptible due to insufficient gradation. In this manner, an image having been subjected to the appropriate dynamic range compressing process can be obtained.

In cases where a shutting light technique is carried out by controlling the distribution of the luminance of an illuminating light source, the selection of the factor of the MTX 17 is the only possible method for controlling the color reproducibility. Therefore, in cases where the color reproducibility is adjusted, both the brightness and the color reproducibility changes simultaneously at an edge in the image, and a print having an unnatural feeling is obtained. However, in the embodiment of the image reproducing apparatus in accordance with the present invention, the MTX 17 is constituted in order to convert the color image signals into the luminance. Therefore, with the embodiment of the image reproducing apparatus in accordance with the present invention, even though the brightness of an edge of an object changes, the color reproducibility at the edge does not change. Accordingly, a print having a natural feeling can be obtained.

Further, LUT 21 has the nonlinear characteristics. Therefore, the gradation correction can be carried out also for the portions of nonlinear characteristics on the original image film (e.g., an over-exposure portion and an under-exposure portion).

Furthermore, in cases where a processing device for sharpness emphasis is added to the image reproducing apparatus, the local contrast of the image can be emphasized.

In the aforesaid embodiment of the image reproducing apparatus in accordance with the present invention, the preliminary read-out operation is carried out in order to obtain the preliminary read-out image signals $S_P$, and the tables in the LUT 15, the LUT 19, and the LUT 21 are set by the automatic set-up algorithm device 27 in accordance with the preliminary read-out image signals $S_P$. Alternatively, the preliminary read-out operation may not be carried out, and the signals corresponding to the final read-out image signals $S_Q$ in the aforesaid embodiment may be obtained with a single read-out operation. In accordance with the signals obtained from the single read-out operation, the tables in the LUT 15, the LUT 19, and the LUT 21 may be set by the automatic set-up algorithm device 27. In this manner, instead of the preliminary read-out operation being carried out, the processing of the image signals can be carried out by carrying out only a single operation for reading out the image from the film 6. Therefore, the image processing can be carried out quickly. Also, since it is sufficient for a single image read-out operation to be carried out, it is not necessary for the film to be moved between the scanning operation and the exposure operation as in the apparatuses described in Japanese Unexamined Patent Publication Nos. 58(1983)-66929 and 64(1989)-35542 and Japanese Patent Publication No. 64(1989)-10819. Accordingly, no deviation occurs between the image signals and the mask signals due to an error occurring in the movement distance, and a reproduced image having good quality can be obtained reliably.

Figure 14:
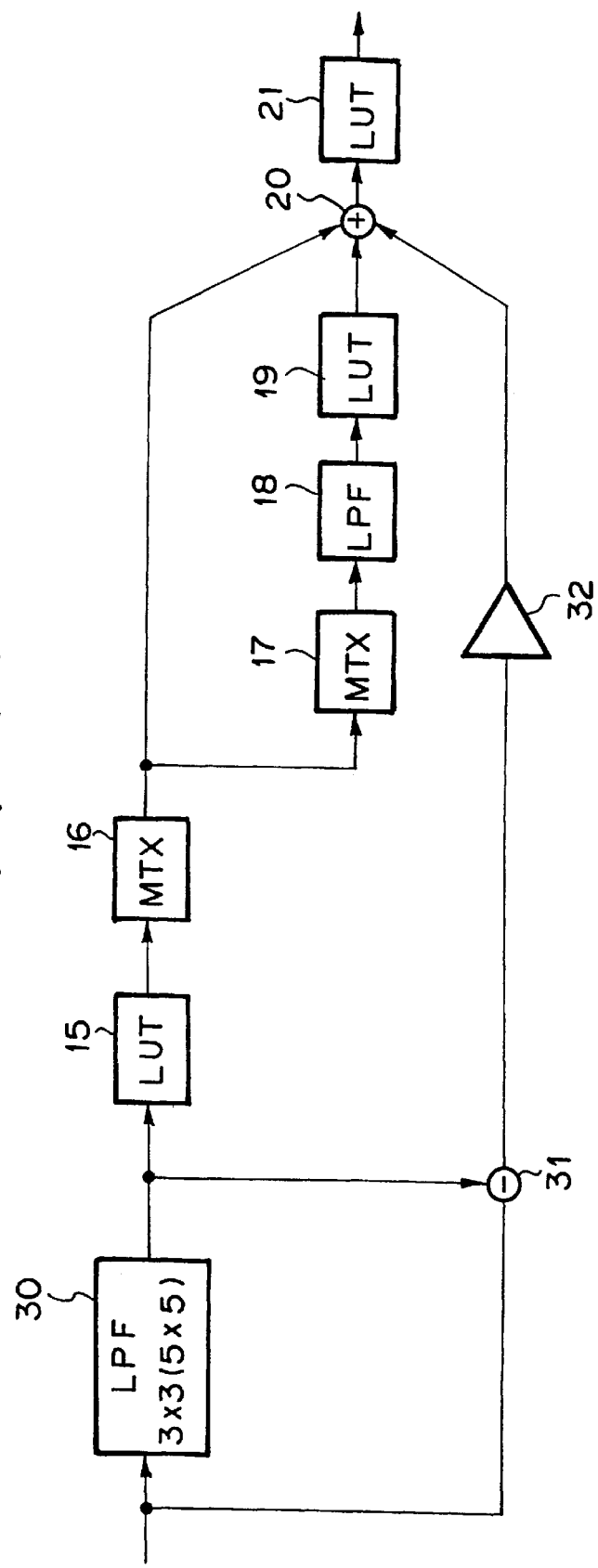
FIG. 14 is a block diagram showing an image processing section in which an unsharp mask processing is carried out.

Further, as illustrated in FIG. 14, in an LPF provided with an unsharp mask having a size of 3×3 or 5×5, a filtering process may be carried out on the final read-out image signals $S_Q$, which have been stored in the frame memories 13R, 13G, and 13B. Unsharp mask signals Sus of the final read-out image signals $S_Q$ may thereby be obtained. In a subtractor 31, the unsharp mask signals Sus may then be subtracted from the original image signals, and difference signals may thereby be obtained. In a gain H 32, the difference signals may be multiplied by a predetermined emphasis coefficient. In the adder 20, the thus obtained difference signals, the original image signals, and the image signal, which has been obtained from the dynamic range compressing process carried out in the LUT 19, may be added together. The resulting signals may then be fed into the LUT 21 and subjected to the gradation processing, and the processed image signals may thereby be obtained. The unsharp mask processing is carried out with Formula (3) shown below.

$$Sproc = Sorg + \beta(Sorg - Sus) \quad (3)$$

wherein Sorg represents the original image signal, Sus represents the unsharp mask signal obtained with the unsharp mask, β represents the emphasis coefficient, and Sproc represents the signal obtained from the unsharp mask processing.

Figure 15:
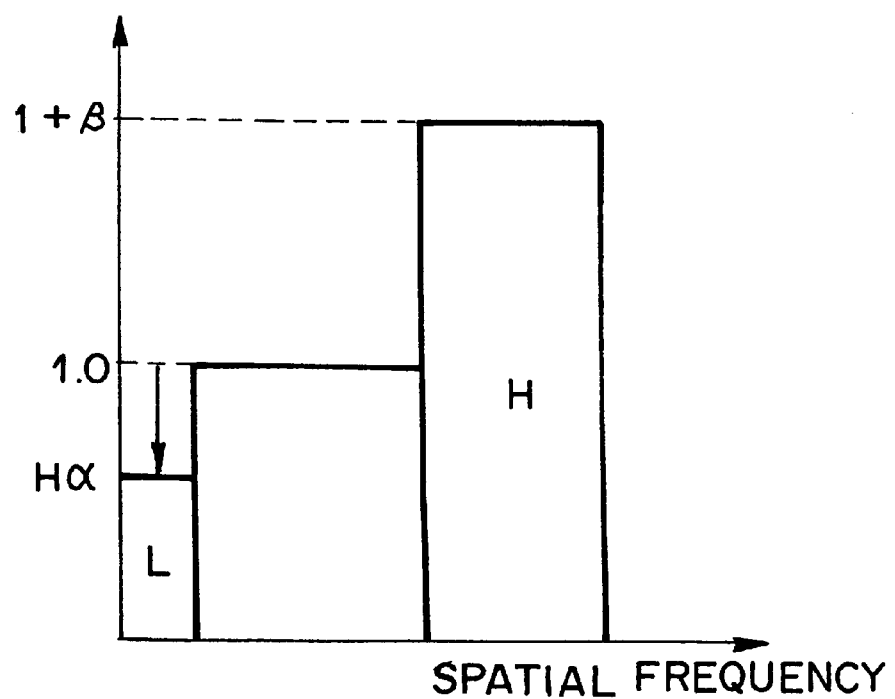
FIG. 15 is a graph showing the frequency characteristics of a processed image signal, which is obtained from image processing containing the unsharp mask processing.

The processed image signals, which are obtained by carrying out the unsharp mask processing even further, have the frequency characteristics shown in FIG. 15. As illustrated in FIG. 15, the processed image signals have the frequency characteristics such that the dynamic range of the low frequency components L may have been compressed by the aforesaid dynamic range compressing process, and such that the high frequency components H may have been emphasized even further. Accordingly, in such cases, a reproduced image in which the sharpness has been emphasized can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image reproducing method, wherein a visible image is reproduced from an image signal representing a color image, the method comprising the steps of:
   i) forming a histogram of the image signal,
   ii) calculating a dynamic range of the image signal in accordance with the histogram,
   iii) setting a rate of dynamic range compression corresponding to a region of the image signal, in which a signal value is comparatively large, a region of the image signal, in which a signal value is comparatively small, and/or an entire region of the image signal, the rate of dynamic range compression being set in accordance with the dynamic range and by taking a predetermined reference level of the image signal as a reference, iv) carrying out a dynamic range compressing process on the image signal with the rate of dynamic range compression set in said step (iii), v) carrying out gradation processing on an image signal, which has been obtained from the dynamic range compressing process, a processed image signal being obtained from the gradation processing, wherein the number of bits of the image signal before carrying out the gradation processing is set to be larger than the number of bits of the processed image signal, wherein the number of bits is set larger during the entire stage of the gradation processing and vi) reproducing a visible image from the processed image signal without false contouring, wherein the image signal is converted into a luminance signal, an unsharp image signal, which represents an unsharp image of the image represented by the luminance signal is formed, and the calculation of the dynamic range, the setting of the rate of dynamic range compression, and said dynamic range compressing process are carried out in accordance with the unsharp image signal.

2. An image reproducing method, wherein a visible image is reproduced from an image signal representing a color image, the method comprising the steps of:

i) forming a histogram of a preliminarily read-out image signal, ii) calculating a dynamic range of the preliminarily read-out image signal in accordance with the histogram, iii) setting a rate of dynamic range compression corresponding to a region of the preliminarily read-out image signal, in which a signal value is comparatively large, a region of the preliminarily read-out image signal, in which a signal value is comparatively small, and/or an entire region of the preliminarily read-out image signal, the rate of dynamic range compression being set in accordance with the dynamic range and by taking a predetermined reference level of the preliminarily read-out image signal as a reference, iv) carrying out a dynamic range compressing process on a final read-out image signal, which has been read-out at finer detection intervals than the preliminarily read-out image signal, with the rate of dynamic range compression set in said step (iii), v) carrying out gradation processing on image signal, which has been obtained from the dynamic range compressing process, a processed image signal being obtained from the gradation processing, wherein the number of bits of the image signal before carrying out the gradation processing is set to be larger than the number of bits of the processed image signal, wherein the number of bits is set larger during the entire stage of the gradation processing and vi) reproducing a visible image from the processed image signal without false contouring, wherein the final read-out image signal is converted into a luminance signal, an unsharp signal, which represents an unsharp image of the image represented by the luminance signal is formed, and the calculation of the dynamic range, the setting of the rate of dynamic range compression, and said dynamic range compressing process are carried out in accordance with the unsharp image signal.

3. An image reproducing method, wherein a visible image is reproduced from an image signal representing a color image, the method comprising the steps of:

i) forming a histogram of the image signal, ii) calculating a dynamic range of the image signal in accordance with the histogram, iii) setting a rate of dynamic range compression corresponding to a region of the image signal, in which a signal value is comparatively large, a region of the image signal, in which a signal value is comparatively small, and/or an entire region of the image signal, the rate of dynamic range compression being set in accordance with the dynamic range and by taking a predetermined reference level of the image signal as a reference, iv) carrying out a dynamic range compressing process on the image signal with the rate of dynamic range compression set in said step (iii), v) carrying out gradation processing on an image signal, which has been obtained from the dynamic range compressing process, a processed image signal being obtained from the gradation processing, and vi) reproducing a visible image from the processed image signal, wherein the image signal is converted into a luminance signal, an unsharp image signal, which represents an unsharp image of the image represented by the luminance signal is formed, and the calculation of the dynamic range, the setting of the rate of dynamic range compression, and said dynamic range compressing process are carried out in accordance with the unsharp image signal, wherein said dynamic range compressing process and the gradation processing is carried out by setting a number of bits of the image signal, which is subjected to said dynamic range compressing process and gradation processing, to be larger than a number of bits of the processed image signal in order to prevent false contouring, wherein the number of bits is set larger during the entire stage of the dynamic range compressing process and the gradation processing.

4. An image reproducing apparatus, wherein a visible image is reproduced from an image signal representing a color image, the apparatus comprising:

histogram forming means for forming a histogram of the image signal, dynamic range calculating means for calculating a dynamic range of the image signal in accordance with the histogram, compression rate setting means for setting a rate of dynamic range compression corresponding to a region of the image signal, in which a signal value is comparatively large, a region of the image signal, in which a signal value is comparatively small, and/or an entire region of the image signal, the rate of dynamic range compression being set in accordance with the dynamic range and by taking a predetermined reference level of the image signal as a reference, dynamic range compressing means for carrying out a dynamic range compressing process on the image signal with the rate of dynamic range compression having thus been set, gradation processing means for carrying out gradation processing on an image signal, which has been obtained from said dynamic range compressing means, and thereby obtaining a processed image signal, wherein the number of bits of the image signal before carrying out the gradation processing is set to be larger than the number of bits of the processed image signal, wherein the number of bits is set larger during the entire stage of the gradation processing, reproducing means for reproducing a visible image from the processed image signal without false contouring, conversion means for converting the image signal into a luminance signal, and unsharp image signal forming means for forming an unsharp image signal, which represents an unsharp image of the image represented by the luminance signal, said dynamic range compressing means carrying out said dynamic range compressing process on the unsharp image signal.

5. An image reproducing apparatus, wherein a visible image is reproduced from an image signal representing a color image, the apparatus comprising:

histogram forming means for forming a histogram of a preliminarily read-out image signal, dynamic range calculating means for calculating a dynamic range of the preliminarily read-out image signal in accordance with the histogram, compression rate setting means for setting a rate of dynamic range compression corresponding to a region of the preliminarily read-out image signal, in which a signal value is comparatively large, a region of the preliminarily read-out image signal, in which a signal value is comparatively small, and/or an entire region of the preliminarily read-out image signal, the rate of dynamic range compression being set in accordance with the dynamic range and by taking a predetermined reference level of the preliminarily read-out image signal as a reference, dynamic range compressing means for carrying out a dynamic range compressing process on a final read-out image signal, which has been read-out at finer detection intervals than the preliminarily read-out image signal, with the rate of dynamic range compression having thus been set, gradation processing means for carrying out gradation processing on an image signal, which has been obtained from said dynamic range compressing means, and thereby obtaining a processed image signal, wherein the number of bits of the image signal before carrying out the gradation processing is set to be larger than the number of bits of the processed image signal, wherein the number of bits is set larger during the entire stage of the gradation processing, reproducing means for reproducing a visible image from the processed image signal without false contouring, conversion means for converting the final read-out image signal into a luminance signal, and unsharp image signal forming means for forming an unsharp image signal, which represents an unsharp image of the image represented by the luminance signal, said dynamic range compressing means carrying out said dynamic range compressing process on the unsharp image signal.

6. An image reproducing apparatus, wherein a visible image is reproduced from an image signal representing a color image, the apparatus comprising:

histogram forming means for forming a histogram of the image signal, dynamic range calculating means for calculating a dynamic range of the image signal in accordance with the histogram, compression rate setting means for setting a rate of dynamic range compression corresponding to a region of the image signal, in which a signal value is comparatively large, a region of the image signal, in which a signal value is comparatively small, and/or an entire region of the image signal, the rate of dynamic range compression being set in accordance with the dynamic range and by taking a predetermined reference level of the image signal as a reference, dynamic range compressing means for carrying out a dynamic range compressing process on the image signal with the rate of dynamic range compression having thus been set, gradation processing means for carrying out gradation processing on an image signal, which has been obtained from said dynamic range compressing means, and thereby obtaining a processed image signal, reproducing means for reproducing a visible image from the processed image signal, conversion means for converting the image signal into a luminance signal, and unsharp image signal forming means for forming an unsharp image signal, which represents an unsharp image of the image represented by the luminance signal, said dynamic range compressing means carrying out said dynamic range compressing process on the unsharp image signal, wherein said dynamic range compressing process and the gradation processing is carried out by setting a number of bits of the image signal, which is subjected to said dynamic range compressing process and gradation processing, to be larger than a number of bits of the processed image signal in order to prevent false contouring, wherein the number of bits is set larger during the entire stage of the dynamic range compressing process and the gradation processing.

* * * * *